United States Patent
Jackson et al.

(10) Patent No.: US 7,721,998 B2
(45) Date of Patent: May 25, 2010

(54) SELF-POWERED SPACECRAFT ATTITUDE CONTROL SYSTEM AND METHOD

(75) Inventors: Louis R. Jackson, Peoria, AZ (US); Bruce W. Rogers, Glendale, AZ (US); Robert E. Winkel, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 256 days.

(21) Appl. No.: 11/685,931

(22) Filed: Mar. 14, 2007

(65) Prior Publication Data

US 2008/0223990 A1  Sep. 18, 2008

(51) Int. Cl.
*B64G 1/28* (2006.01)
(52) U.S. Cl. .................... 244/165; 244/164; 701/13
(58) Field of Classification Search ................ 244/165
See application file for complete search history.

(56) References Cited

U.S. PATENT DOCUMENTS

| | | | | |
|---|---|---|---|---|
| 5,437,420 A | * | 8/1995 | Rosen | 244/165 |
| 5,628,267 A | * | 5/1997 | Hoshio et al. | 114/122 |
| 6,135,392 A | * | 10/2000 | Wakugawa | 244/164 |
| 6,154,691 A | * | 11/2000 | Bailey | 701/13 |
| 6,779,759 B1 | * | 8/2004 | Klupar et al. | 244/165 |
| 2002/0040950 A1 | * | 4/2002 | Staley et al. | 244/165 |
| 2006/0049314 A1 | * | 3/2006 | Peck | 244/165 |
| 2007/0252044 A1 | * | 11/2007 | Jackson et al. | 244/165 |

\* cited by examiner

*Primary Examiner*—Timothy D Collins
*Assistant Examiner*—Justin Benedik
(74) *Attorney, Agent, or Firm*—Ingrassia Fisher & Lorenz, P.C.

(57) ABSTRACT

A system and method are provided for operating a control moment gyro (CMG) in a spacecraft. The CMG includes a spin motor, and a CMG rotor that is coupled to the spin motor and is configured to rotate about a spin axis. Electrical power from a power source is supplied to the spin motor to rotate the CMG rotor about the spin axis. A determination is made as to whether the power source can supply sufficient electrical power to the spin motor. If the power source cannot supply sufficient electrical power to the spin motor, the spin motor is rotated by the CMG rotor to generate and supply electrical power to the power source.

12 Claims, 2 Drawing Sheets

SELF-POWERED SPACECRAFT ATTITUDE CONTROL SYSTEM AND METHOD

TECHNICAL FIELD

The present invention generally relates to attitude control systems for satellites and other space vehicles, and more particularly relates to self-powered attitude control systems and methods for such vehicles.

BACKGROUND

Attitude control in many spacecraft is implemented using one or more control moment gyros (CMGs). A CMG is a torque-generating mechanism that may include a rotating flywheel, or rotor, that is rotationally mounted in a gimbal frame. A spin motor may be coupled to the rotor and may be energized and controlled to rotate the rotor about a spin axis at a substantially constant rotational velocity. The gimbal frame may be rotationally mounted about one or more gimbal axes, which are perpendicular to the spin axis. Additionally, one or more actuators may be coupled to the gimbal frame and, in response to gimbal rate commands, may rotate the gimbal frame about one or more of the gimbal axes. By rotating the frame about one or more of the gimbal axes at certain rates, torques can be generated in the spacecraft body to effect spacecraft attitude control.

Although typical CMG-implemented attitude control systems, such as the one described above, are generally safe, reliable, and robust, these systems can exhibit potential drawbacks. For example, if the spacecraft is moving as a result of prior gimbal rate command having been issued to a CMG, and electrical power becomes unavailable to the CMG spin motor, or to various other components or subsystems in the spacecraft attitude control system, then the CMG, and concomitantly the spacecraft, may be subjected to undesirable mechanical stresses. These stresses may result from the rapid, uncontrolled motion of the CMG's gimbals due to gyroscopic effects from the satellite body rates.

Hence, there is a need for a system and method that mitigates or avoids undesirable mechanical stresses that can result from an unlikely loss of power to the CMG spin motor. The present invention addresses at least this need.

BRIEF SUMMARY

In one embodiment, and by way of example only, a spacecraft attitude control system includes an attitude controller and a control moment gyro (CMG). The attitude controller is configured to selectively supply gimbal rate commands. The CMG is configured to rotate about a gimbal axis, is coupled to receive the gimbal rate commands, and is configured, upon receipt of the gimbal rate commands, to rotate at the commanded gimbal rate about the gimbal axis. The CMG includes a CMG rotor and a spin motor. The CMG rotor is rotationally mounted and is configured to rotate about a spin axis that is perpendicular to the gimbal axis. The spin motor is coupled to the CMG rotor and is adapted to be selectively energized and deenergized. The spin motor is configured, upon being energized, to rotate the CMG rotor about the spin axis and, upon being deenergized, to be rotated by the CMG rotor and generate and supply electrical power to at least the attitude controller.

In another exemplary embodiment, a control moment gyro (CMG) includes a gimbal frame, a CMG rotor, a spin motor, and a spin motor controller. The gimbal frame is configured to rotate about a gimbal axis. The CMG rotor is rotationally coupled to the gimbal frame and is configured to rotate about a spin axis that is perpendicular to the gimbal axis. The spin motor is coupled to the CMG rotor and is adapted to be selectively energized and deenergized. The spin motor is configured, upon being energized, to rotate the CMG rotor about the spin axis and, upon being deenergized, to be rotated by the CMG rotor and generate electrical power. The spin motor controller is coupled to the spin motor and is operable to selectively energize the spin motor and selectively receive and supply the electrical power generated by the spin motor.

In yet another exemplary embodiment, a method of operating, in a spacecraft, a control moment gyro (CMG) that includes a spin motor and a CMG rotor that is coupled to the spin motor and is configured to rotate about a spin axis, includes supplying electrical power from a power source to the spin motor to rotate the CMG rotor about the spin axis. A determination is made as to whether the power source cannot supply sufficient electrical power to the spin motor. If the power source cannot supply sufficient electrical power to the spin motor, the spin motor is rotated with the CMG rotor to generate and supply electrical power to the power source.

BRIEF DESCRIPTION OF THE DRAWINGS

Embodiments of the present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
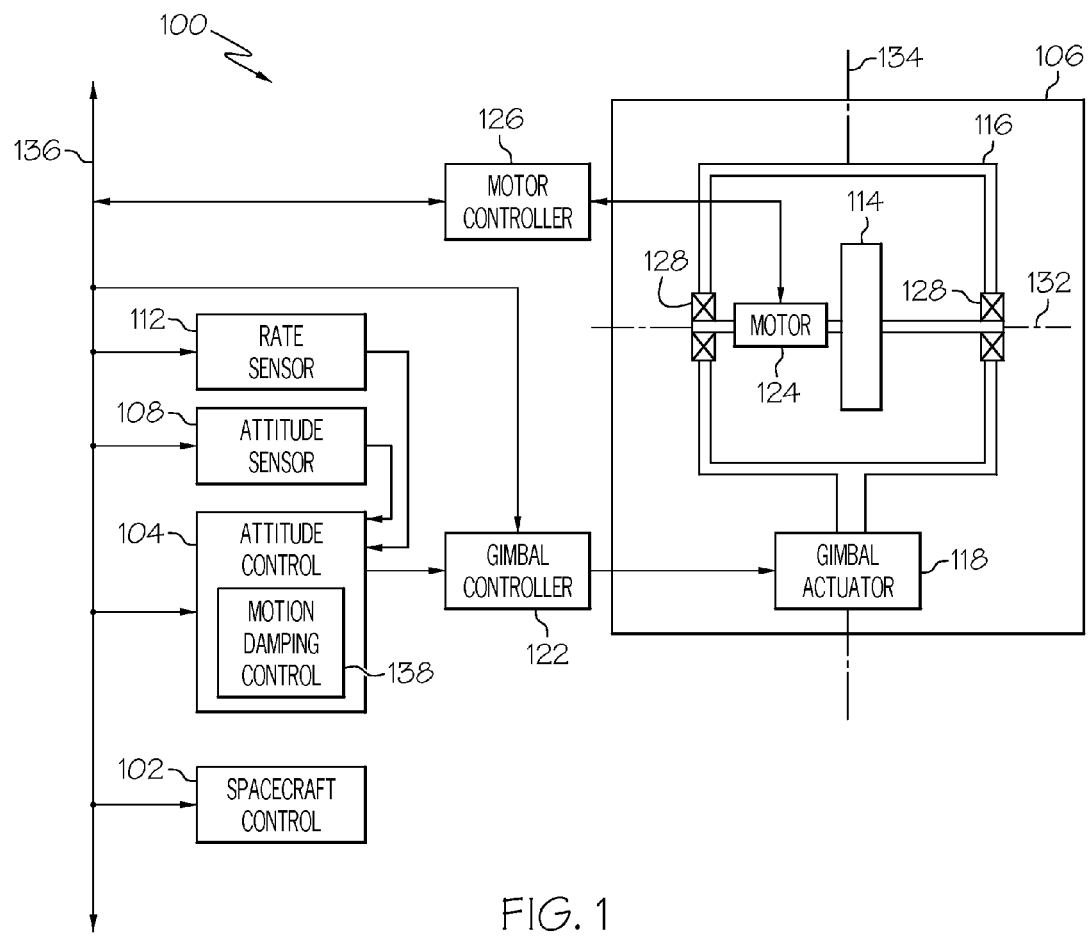
FIG. 1 is a functional block diagram depicting a portion of a spacecraft attitude control system according to an embodiment of the present invention.

Turning first to FIG. 1, a simplified schematic block diagram of an embodiment of a spacecraft attitude control system 100 is depicted. The system 100 includes a spacecraft control 102, an attitude control 104, and a plurality of control moment gyros (CMGs) 106. Before proceeding further, it is noted that for clarity, and for ease of depiction and description, only a single CMG is shown. It will be appreciated, however, that the system 100 may include three or more CMGs.

Returning again to the description of the system 100, the spacecraft control 102 is configured to receive data representative of desired spacecraft attitude from, for example, an earthbound station or a non-illustrated onboard autopilot. The spacecraft control 102, in response to the received data, supplies appropriate attitude (or torque) commands to the attitude control 104. The attitude control 104, in response to the torque commands, appropriately controls the operation of the CMG 106 to induce appropriate attitude disturbances in the spacecraft, and thereby control spacecraft attitude. One or more spacecraft dynamic sensors, such as one or more attitude sensors 108 and one or more rate sensors 112, sense spacecraft attitude and attitude rate-of-change, respectively, and supply feedback signals representative thereof to the attitude control 104.

The CMG 106 may be used in conjunction with other CMGs 106 to control spacecraft attitude. In the depicted embodiment, the CMG 106 includes a rotor 114, a gimbal frame 116, one or more gimbal actuators 118, a gimbal controller 122, a spin motor 124, and a motor controller 126. The CMG rotor 114 is rotationally supported on the gimbal frame 116 via, for example, a plurality of bearing assemblies 128, and is configured to rotate about a spin axis 132. The gimbal frame 116 is rotationally supported about one or more gimbal axes 134, which are perpendicular to the spin axis 132. The gimbal controller 118 receives gimbal rate commands from the attitude control 104 and, in response, selectively energizes the gimbal actuators 118. The gimbal actuators 118, when energized, move the gimbal frame 116 at the commanded rate along the gimbal axes 134. One or more non-illustrated sensors that can sense, for example, the position and rate of the gimbal frame 116, may be included to supply position and rate feedback signals to the gimbal controller 118.

The spin motor 124 is coupled to the CMG rotor 114 and is adapted to be selectively energized and deenergized. The spin motor 124 is configured such that, when it is energized, it rotates the CMG rotor 114 about the spin axis 132, and when it is deenergized, it is rotated by the CMG rotor 114 and generates electrical power. Typically, the spin motor 124 is energized from, and its rotational speed (and thus that of the CMG rotor 114) is controlled by, the spin motor controller 126. More specifically, the spin motor controller 126 is coupled between the spin motor 124 and an electrical power source such as, for example, a power distribution bus 136. The motor controller 126 is configured such that, when the power distribution bus 136 is appropriately energized from a non-illustrated power source, the motor controller 126 energizes and controls the rotational speed of the spin motor 124. Conversely, if the power distribution bus 136 is not appropriately energized from the non-illustrated power source, then the motor controller 126 will not energize the spin motor 124. Instead, the motor controller 126 will receive the electrical power generated by the spin motor 124, and regulate and supply at least a portion of this power to the power distribution bus 136. It will be appreciated that the spin motor 124 could be any one of numerous motor designs known now, or developed in the future including, but not limited to, various types of DC and AC motor designs. Preferably, however, the spin motor 124 is a permanent magnet, brushless DC motor.

As FIG. 1 also depicts, the system 100 preferably includes motion damping control 138. In the depicted embodiment, the motion damping control 138 is implemented in the attitude control 104. It will be appreciated, however, that this is merely exemplary, and that the motion damping control 138 could be physically implemented as a stand-alone device, or in other components or subsystems. No matter how or where it is physically implemented, the motion damping control 138 is coupled to receive the gimbal rate commands supplied by the attitude control 104, and is operable to determine if the gimbal rate commands are valid or invalid. If the gimbal rate commands are determined to be valid, the motion damping control 138 allows the gimbal rate commands to pass through to the gimbal controller 122. Conversely, if the gimbal rate commands are determined to be invalid, which includes being unavailable, interrupted, or a combination thereof, then the motion damping control 138 selectively supplies modified (or "synthetic") gimbal rate commands to the gimbal controller 122. These modified gimbal rate commands cause the spacecraft to be maintained in, or gradually reduce its rotation until it achieves, a predetermined quiescent state. It will be appreciated that the motion damping control 138 may be variously configured, and may implement the above-described functionality using any one of numerous processes. Some exemplary configurations for the motion damping control 138, and an exemplary process implemented thereby, are disclosed in U.S. patent application Ser. No. 11/394,037, entitled "Satellite Active Motion Damping," filed Mar. 29, 2006, and assigned to the assignee of the instant application.

The spacecraft control 102, the attitude control 104, the gimbal controller 122, the motor controller 126, and the motion damping control 138, are all electrically powered. In the depicted embodiment, each is coupled to, and receives electrical power from, the power distribution bus 136. The gimbal actuators 118 and spin motor 124 are also selectively energized from the power distribution bus 136, via the gimbal controller 122 and the motor controller 126, respectively. It may thus be appreciated that if a fault occurs on the power distribution bus 136, or if the non-illustrated electrical power source that supplies electrical power to the power distribution bus 136 becomes inoperable, unavailable, or otherwise unable to supply sufficient electrical power, then electrical power to energize the gimbal actuators 118 and the spin motor 124 may be unavailable. As was previously noted, such an event can subject the CMG 106 and the spacecraft to undesirable mechanical stresses. However, as was also noted above, the spin motor 124 is configured such that when it is not energized and is rotated by the CMG rotor 114 it will act as a generator and generate electrical power. The spin motor 124 will continue to generate electrical power until the rotational energy stored in the CMG rotor 114 dissipates, and the CMG rotor 114 can no longer rotate the spin motor 124 at a sufficient rate. It was additionally noted above that the motor controller 126 may be configured to receive the electrical power generated by the spin motor 124, and supply at least a portion of this power to the power distribution bus 136. It will be appreciated that a separate, non-depicted device could be configured to transfer the electrical power generated by the spin motor 124 to the power distribution bus 136.

From the above it may be appreciated that as long as the CMG rotor 114 is able to rotate the spin motor 124 at a sufficient rate, the attitude control 104, gimbal controller 122, and the motion damping control 138 will remain energized and operable. The gimbal controller 122 will also be able to selectively energize the gimbal actuators 118. It will additionally be appreciated that, should such an event occur, the attitude control 104 and/or the motion damping control 138 will automatically supply appropriate gimbal rate commands to the gimbal controller 122 to cause an orderly reduction in spacecraft motion. The attitude control 104 could be configured to maintain the last valid rate command it issued prior to the loss or reduction of power, or it could be configured to retrieve and issue a predetermined, pre-stored command.

Figure 2:
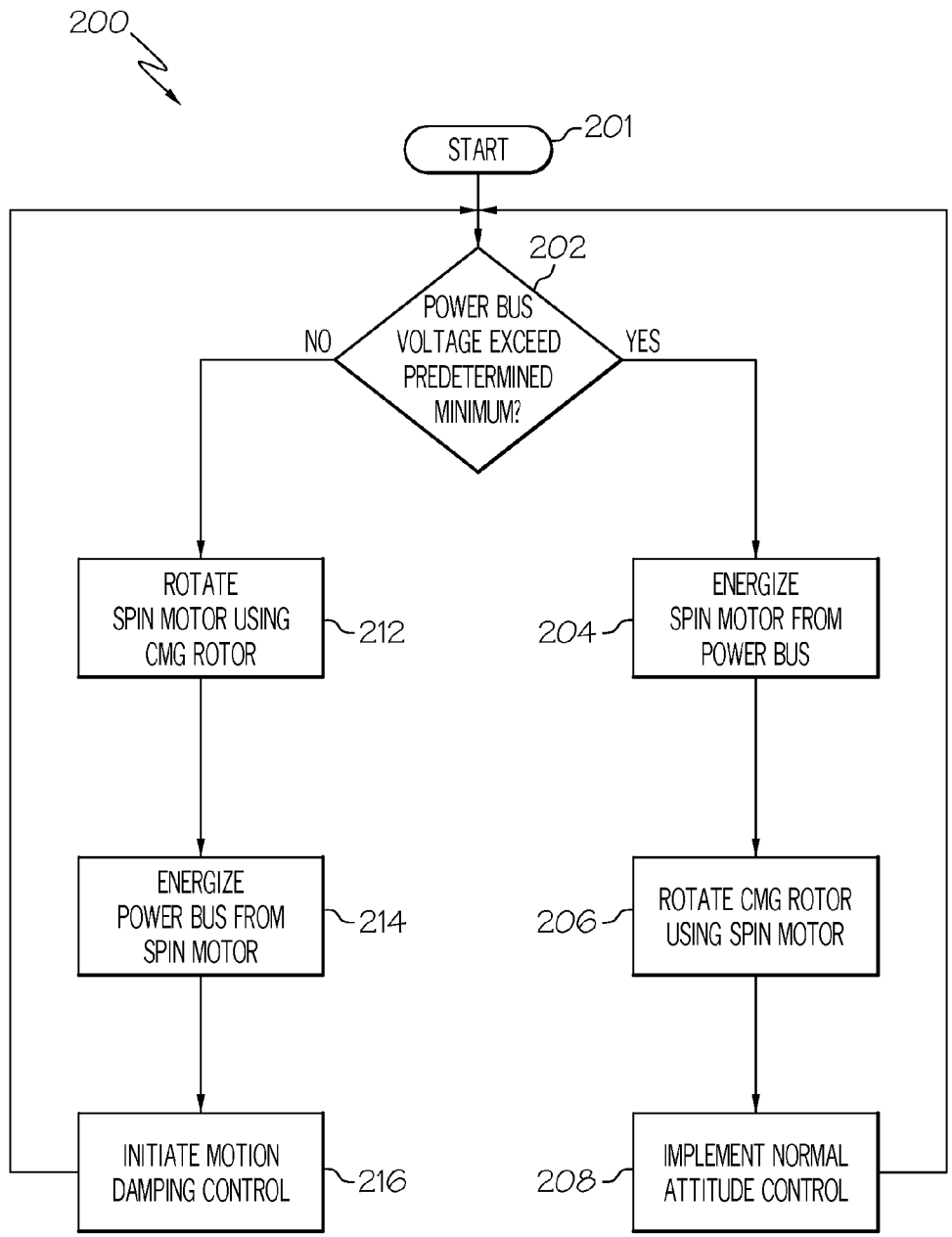
FIG. 2 depicts, in flowchart form, an exemplary method of operating the system of FIG. 1.

Turning now to FIG. 2, an exemplary process implemented by the system 100 is depicted in flowchart form, and will be described. The depicted process 200 illustrates one exemplary method of determining if the electrical power on the power distribution bus 136 is available and/or sufficient, and for supplying electrical power to the power distribution bus 136 using the rotational energy stored in the CMG rotor 114. In accordance with the depicted embodiment, the system 100 continuously makes a determination as to whether the power distribution bus 136 can supply sufficient electrical power (202). This determination can be made using any one of numerous techniques, but in the depicted embodiment a determination is made as to whether the voltage on the power distribution bus 136 exceeds a predetermined voltage magnitude. It will also be appreciated that any one of numerous components, devices, or subsystems can be configured to make this determination. In the embodiment depicted in FIG. 1, the motor controller 126 is configured to make this determination.

No matter which component, device, or subsystem makes the determination, if the power distribution bus voltage does exceed the predetermined magnitude, then the motor controller 126 energizes the spin motor 124 from the power distribution bus 136 (204), and controls the spin motor to rotate the CMG rotor 114 at a constant rotational speed (206). The system 100 also implements normal attitude control of the spacecraft (208). In other words, the attitude control 104 is responsive to commands from the spacecraft control 102 to control the operation of the CMG 106 to induce appropriate attitude disturbances in the spacecraft. It is noted that if, while implementing the normal attitude control (208), the motion damping control 138 determines that the gimbal rate commands supplied to the gimbal controller 122 are invalid, then the motion damping control 138 will supply modified gimbal rate commands to the gimbal actuators 118.

As FIG. 2 also depicts, if the power distribution bus voltage does not exceed the predetermined magnitude, then the motor controller 126 no longer energizes the spin motor 124 to rotate the CMG rotor 114. Instead, the spin motor 124 is rotated by the CMG rotor 114 (212). As the spin motor 124 rotates, it generates electrical power, which the motor controller 126 supplies to the power distribution bus 136 (214). As noted above, the motor controller 126 may additionally be configured to rectify (if necessary) and regulate the electrical power generated by the spin motor 124. The system 100 also preferably implements motion damping control of the spacecraft to cause the spacecraft to be maintained in, or gradually reduce its rotation until it achieves, a predetermined quiescent state (216).

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A spacecraft attitude control system, comprising:
   an attitude controller configured to selectively supply gimbal rate commands;
   a motion damping controller coupled to receive the supplied gimbal rate commands and determine if the supplied gimbal rate commands are available or unavailable;
   allow the supplied gimbal rate commands to pass for execution if the supplied gimbal rate commands are available; and
   supply modified gimbal rate commands that cause a gradual reduction of any spacecraft rotation to a predetermined quiescent state if the supplied gimbal rate commands are unavailable; and
   a control moment gyro (CMG) coupled to receive the valid gimbal rate commands and the modified gimbal rate commands and configured, upon receipt thereof, to rotate at the commanded gimbal rate about a gimbal axis, the CMG comprising:
   a rotationally mounted CMG rotor configured to rotate about a spin axis that is perpendicular to the gimbal axis, and
   a spin motor coupled to the CMG rotor and adapted to be selectively energized and deenergized, the spin motor configured to rotate the CMG rotor about the spin axis and, upon being deenergized, to be rotated by the CMG rotor and generate electrical power.

2. The system of claim 1, further comprising:
   a spin motor controller coupled to the spin motor, the spin motor controller operable to (i) selectively energize the spin motor and (ii) selectively receive the electrical power generated by the spin motor and supply at least a portion of the electrical power to the attitude controller and the motion damping controller.

3. The system of claim 2, wherein the spin motor controller is further operable to selectively regulate the electrical power supplied by the spin motor.

4. The system of claim 1, wherein the CMG further comprises:
   a gimbal frame configured to rotate about the gimbal axis, and rotationally coupled to the CMG rotor.

5. The system of claim 4, further comprising:
   a gimbal actuator coupled to the gimbal frame, the gimbal actuator adapted to be selectively energized and operable, upon being energized, to rotate the CMG about the gimbal axis; and
   a gimbal controller coupled to receive the gimbal rate commands and operable, in response thereto, to selectively energize the gimbal actuator.

6. The system of claim 5, wherein the electrical power generated by the spin motor is additionally supplied to the gimbal controller.

7. The system of claim 1, further comprising:
   a spacecraft control operable to supply attitude control commands to the attitude controller,
   wherein the attitude controller is responsive to the attitude control commands to supply the gimbal rate commands.

8. The system of claim 7, wherein the electrical power generated by the spin motor is additionally supplied to the spacecraft control.

9. The system of claim 1, further comprising:
   a power distribution bus coupled between the spin motor and the attitude controller to receive the electrical power generated by the spin motor and supply the electrical power to the attitude controller.

10. The system of claim 1, wherein the spin motor comprises a brushless DC motor.

11. The system of claim 10, wherein the spin motor comprises a permanent magnet, brushless DC motor.

12. The spacecraft attitude control system of claim 2, wherein the spin motor is coupled to the attitude controller and the motion damping controller via a power distribution bus and the spin motor controller is further operable to:
   (i) selectively energize the spin motor when the power distribution bus voltage exceeds a predetermined magnitude; and
   (ii) selectively deenergize the spin motor when the power distribution bus does not exceed the predetermined magnitude.

* * * * *